E. L. SIMPSON.
PIE MARKER AND TRIMMER.
APPLICATION FILED OCT. 1, 1920.
1,377,974.
Patented May 10, 1921.
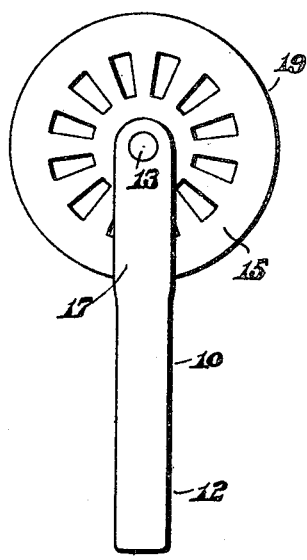
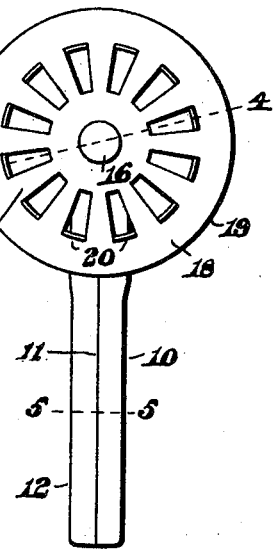
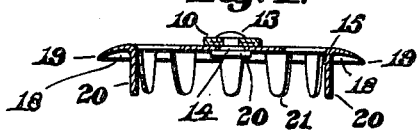
Inventor:
Evelyn L. Simpson,
by Walter E. Lombard,
Atty.

UNITED STATES PATENT OFFICE.

EVELYN L. SIMPSON, OF WATERVILLE, MAINE.

PIE MARKER AND TRIMMER.

1,377,974.                    Specification of Letters Patent.    Patented May 10, 1921.

Application filed October 1, 1920. Serial No. 414,016.

*To all whom it may concern:*

Be it known that I, (Mrs.) EVELYN L. SIMPSON, a citizen of the United States of America, and a resident of Waterville, in the county of Kennebec and State of Maine, have invented certain new and useful Improvements in Pie Markers and Trimmers, of which the following is a specification.

This invention relates to devices for marking and trimming pies and has for its object the production of an article of this character which will be inexpensive to construct, simple to operate and readily cleaned.

The invention consists of a handle having pivotally mounted on one end a revoluble disk having a cutting edge and a plurality of lateral projections extending from one face and equi-distant from the center of said disk.

The invention further consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents a front elevation of a device embodying the principles of the present invention.

Fig. 2 represents an edge view of the same.

Fig. 3 represents a rear elevation of the same.

Fig. 4 represents a horizontal section on line 4, 4, on Fig. 3, and

Fig. 5 represents a section through the handle on line 5, 5, on Fig. 3.

Similar characters indicate like parts throughout the several figures of the drawings.

In the drawings, 10 is a handle made of sheet metal folded over so that its edges abut as indicated at 11.

The body portion 12 of the handle is made with its sides separated as shown in Fig. 5 while the opposite end thereof is compressed so that the inner faces of the side walls are in contact as indicated in Fig. 4.

One end of the handle 10 has secured therein, a stud 13 which is preferably riveted thereto and said stud is provided with a headed projection 14 which extends through a central opening in a disk 15.

The projection 14 is of greater length than the thickness of the disk 15 so that the said disk 15 is freely revoluble about said projection, the head 16 of which is of sufficient diameter to prevent the displacement of the disk.

To reduce the frictional contact of said disk with said handle 10, the latter is bent outwardly at 17 leaving only a small surface about the stud 13 which can contact with the disk 15.

This disk 15 is concaved as indicated at 18 in Fig. 4 and has a sharp edge 19 adapted to cut off the surplus dough from the pie when the device is used.

The disk 15 has cut therein, a plurality of U-shaped incisions forming ears integral with the disk 15 and these ears are bent laterally from the concaved face of the said disk thus forming projections 20 which are arranged in a circular path and equidistant from the center of the disk as indicated in Figs. 3 and 4.

The various projections are separted from each other as shown in said Figs. 3 and 4, the width of the space between the projections being preferably substantially the width of the said projections 20.

The ends of the projections 20 are preferably rounded off as indicated at 21 in Figs. 2 and 4.

These projections 20 are located a distance from the cutting edge 19 greater than the thickness of the pie plate and the upper and lower dough layers of the pie thereon.

When the device is to be used, the operator grips the handle 10 and cuts through the dough layers with the cutting edge 19 and then moves the device around the edge of the pie plate with the projections 20 extending inwardly toward the center of the pie.

During this operation all surplus dough beyond the edge of the pie plate is trimmed off and as the disk 15 revolves the projections 20 will force portions of the upper dough layer into firm contact with the lower dough layer thereby forming a plurality of corrugations around the edge of the pie.

It is obvious that owing to the concaved formation of the disk 15 and the fact that the base ends of the projections 20 are farther from the center of the pie than the cutting edge 19, the corrugations in the pie will always extend to the extreme outer edge of said pie.

The device is inexpensive to construct, simple in operation and can be cleansed quickly thereby making it perfectly sanitary.

It is believed that the operation and many advantages of the invention will be understood readily without further description.

Having thus described my invention, I claim—

1. A device of the class described consisting of a handle; a disk revolubly mounted on one end thereof; and a plurality of lateral projections extending outwardly from one face of said disk and formed integral therewith.

2. A device of the class described consisting of a handle; a concaved disk provided with a plurality of lateral projections stamped therefrom and equi-distant from the center of said disk; and a pivot member secured in one end of said handle and on which said disk is revolubly mounted.

Signed by me at Waterville, Maine, this 24 day of Sept., 1920.

EVELYN L. SIMPSON.

Witnesses:
F. M. ROLLINS,
GRACE L. VOSE.